(12) United States Patent
Huang

(10) Patent No.: US 12,474,542 B2
(45) Date of Patent: Nov. 18, 2025

(54) LENS DEVICE AND LENS SET MOVING MECHANISM THEREOF

(71) Applicant: VASSTEK INTERNATIONAL CORP., Miaoli (TW)

(72) Inventor: Chih-Ming Huang, Miaoli (TW)

(73) Assignee: Vasstek International Corp., Miaoli (TW)

( * ) Notice: Subject to any disclaimer, the term of this patent is extended or adjusted under 35 U.S.C. 154(b) by 895 days.

(21) Appl. No.: 17/392,988

(22) Filed: Aug. 3, 2021

(65) Prior Publication Data

US 2022/0342177 A1 Oct. 27, 2022

(30) Foreign Application Priority Data

Apr. 26, 2021 (TW) ................. 110114994

(51) Int. Cl.
G02B 7/09 (2021.01)
G02B 7/08 (2021.01)
G02B 13/00 (2006.01)
H04N 23/54 (2023.01)

(52) U.S. Cl.
CPC ................. *G02B 7/09* (2013.01); *G02B 7/08* (2013.01); *G02B 13/009* (2013.01); *H04N 23/54* (2023.01)

(58) Field of Classification Search
None
See application file for complete search history.

(56) References Cited

U.S. PATENT DOCUMENTS

2022/0256058 A1* 8/2022 Kim ....................... H04N 23/55

* cited by examiner

*Primary Examiner* — Stephone B Allen
*Assistant Examiner* — Tamara Y. Washington
(74) *Attorney, Agent, or Firm* — Margaret S. Millikin

(57) ABSTRACT

A lens device includes a housing; a first lens set having a first end and a second end, wherein the first end is fixed on one of the housing and a first stage, and a moving space is formed between the second end and the housing; a second stage disposed on the housing, and slidable in the moving space; and a second lens set disposed on the second stage, and configured to perform a focusing function of the lens device.

7 Claims, 9 Drawing Sheets

A-A

LENS DEVICE AND LENS SET MOVING MECHANISM THEREOF

CROSS-REFERENCE TO RELATED APPLICATION AND CLAIM OF PRIORITY

The application claims the benefit of Taiwan Patent Application No. 110114994, filed on Apr. 26, 2021, at the Taiwan Intellectual Property Office, the disclosures of which are incorporated herein in their entirety by reference.

FIELD OF THE INVENTION

The present invention relates to a lens and the lens set moving mechanism thereof, and more particularly to a miniature lens and the lens set moving mechanism thereof used in a handheld electronic device such as a mobile phone.

BACKGROUND OF THE INVENTION

Hand-held electronic devices such as mobile phones are now the most commonly used photographic devices. Due to the small size of the hand-held electronic device, the lens zooming method used to be digitally zoomed; that is, only a small area is captured on the photosensitive element to achieve the enlargement of the target. However, this method causes the resolution to drop sharply. Afterwards, the traditional zooming lens is used to perform the zooming action. Nevertheless, the way of changing the distance between the lens sets (lens groups) by the traditional zooming lens is limited to the structure. Please refer to FIG. 1, which is a side cross-sectional view of a zooming lens 0 in the prior art. As shown in FIG. 1, the first lens set L1 is disposed on the first lens barrel 01, the second lens set L2 is disposed on the second lens barrel 02, and the second lens barrel 02 is sleeved in the first lens barrel 01. When the first lens set L1 approaches the second lens set L2, it might hit the second lens barrel 02. Therefore, the length of the inner lens barrel 02 affects the shortest distance between the two lens sets L1, L2. Furthermore, because the lens set and the thickness thereof are particularly small in the miniature photography device, the precision requirements in the assembly and the movement of the lens set are higher. Thus, the length of the structure for fixing and moving the lens set on the optical axis, such as the lens barrel, is much larger than the thickness of the lens set. Possibly, the length of the structure for fixing and moving the lens set on the optical axis is two to three times the thickness of the lens set in order to prevent the lens set from shaking to cause the optical axis to deflect and decenter. It can be seen that in the field of the miniature lens, the negative effect of the length of the lens barrel is significant. This not only increases the length of the entire lens, but also increases the diameter of the lens, which indirectly affects the mobile phone so that the size of the mobile phone is difficult to shrink.

In order to overcome the drawbacks in the prior art, a lens device and the lens set moving mechanism thereof are disclosed. The particular design in the present invention not only solves the problems described above, but also is easy to implement. Thus, the present invention has utility for the industry.

SUMMARY OF THE INVENTION

The present invention discloses a lens device and the lens set moving mechanism thereof to achieve the effects of the stable lens set movement and the reduced lens size at the same time.

In order to achieve the purposes of reducing the size of the miniature lens, not affecting the performance of the lens zooming and focusing, and maintaining the accuracy of the optical axis, through the moving space in the lens device, the lens device and the lens set moving mechanism of the present invention can allow the supporting structure for supporting one lens set to pass the peripheral of another lens set when it moves without the interference. In this way, the distance between the lens sets can be very close, or even zero, without sacrificing the stability when the lens sets are moving.

In accordance with an aspect of the present invention, a lens device is disclosed. The lens device includes a housing having a first end and a second end opposite to the first end; a first track disposed from the first end to the second end in the housing; a second track disposed from the first end to the second end in the housing, and located opposite to the first track; a first stage movably disposed on the first track, and bearing thereon a first lens set; a second stage movably disposed on the second track, and bearing thereon a second lens set; a third lens set and a first ducking space disposed at the first end; and a fourth lens set and a second ducking space disposed at the second end, wherein a first distance between the first lens set and the second track is greater than a first thickness of the second stage, and a second distance between the second lens set and the first track is greater than a second thickness of the first stage.

In accordance with another aspect of the present invention, a lens set moving mechanism is disclosed. The lens set moving mechanism includes a first stage having a first end and a second end opposite to the first end, and bearing a first lens set on the first end; and a second stage having a third end and a fourth end opposite to the third end, and bearing a second lens set on the fourth end, wherein when the first stage and the second stage approach each other, the second stage passes a first peripheral of the first lens set, or the first stage passes a second peripheral of the second lens set.

In accordance with a further aspect of the present invention, a lens device is disclosed. The lens device includes a housing; two stages slidably disposed on the housing; and two lens sets having an optical axis, and respectively disposed on the two stages to complete a zooming function or a focusing function of the lens device, wherein the two stages are disposed in the housing along an axial direction of the optical axis; and each of the two stages has a specific geometric shape configured to allow the distance between the two lens sets to be zero.

In accordance with further another aspect of the present invention, a lens device is disclosed. The lens device includes a housing; a first lens set having a first end and a second end, wherein the first end is fixed on one of the housing and a first stage, and a moving space is formed between the second end and the housing; a second stage disposed on the housing, and slidable in the moving space; and a second lens set disposed on the second stage, and configured to perform a focusing function of the lens device.

The above objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENTS

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 2:
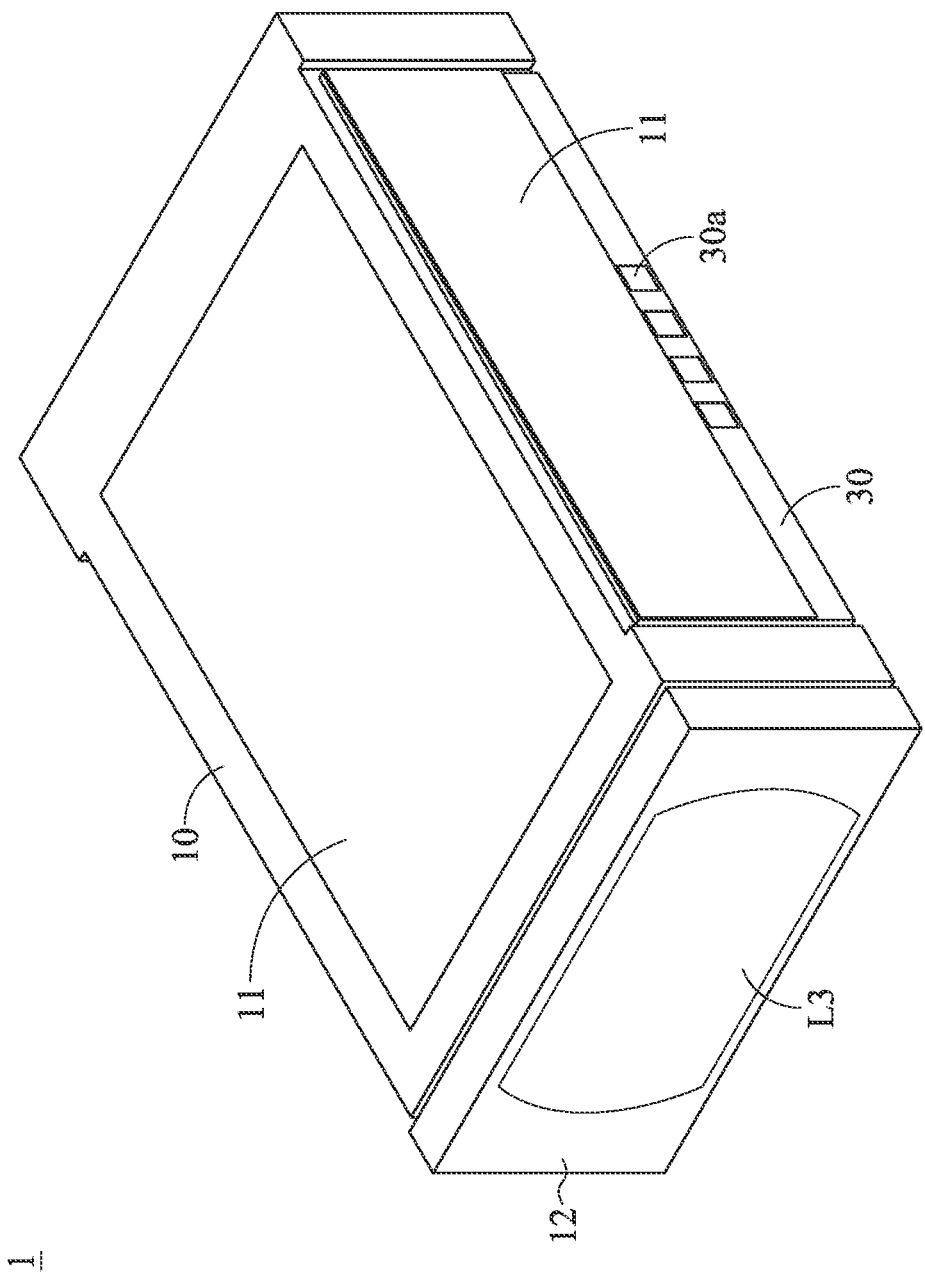
FIG. 2 is a three-dimensional view of the appearance of a lens device according to a first embodiment of the present invention.
Figure 3:
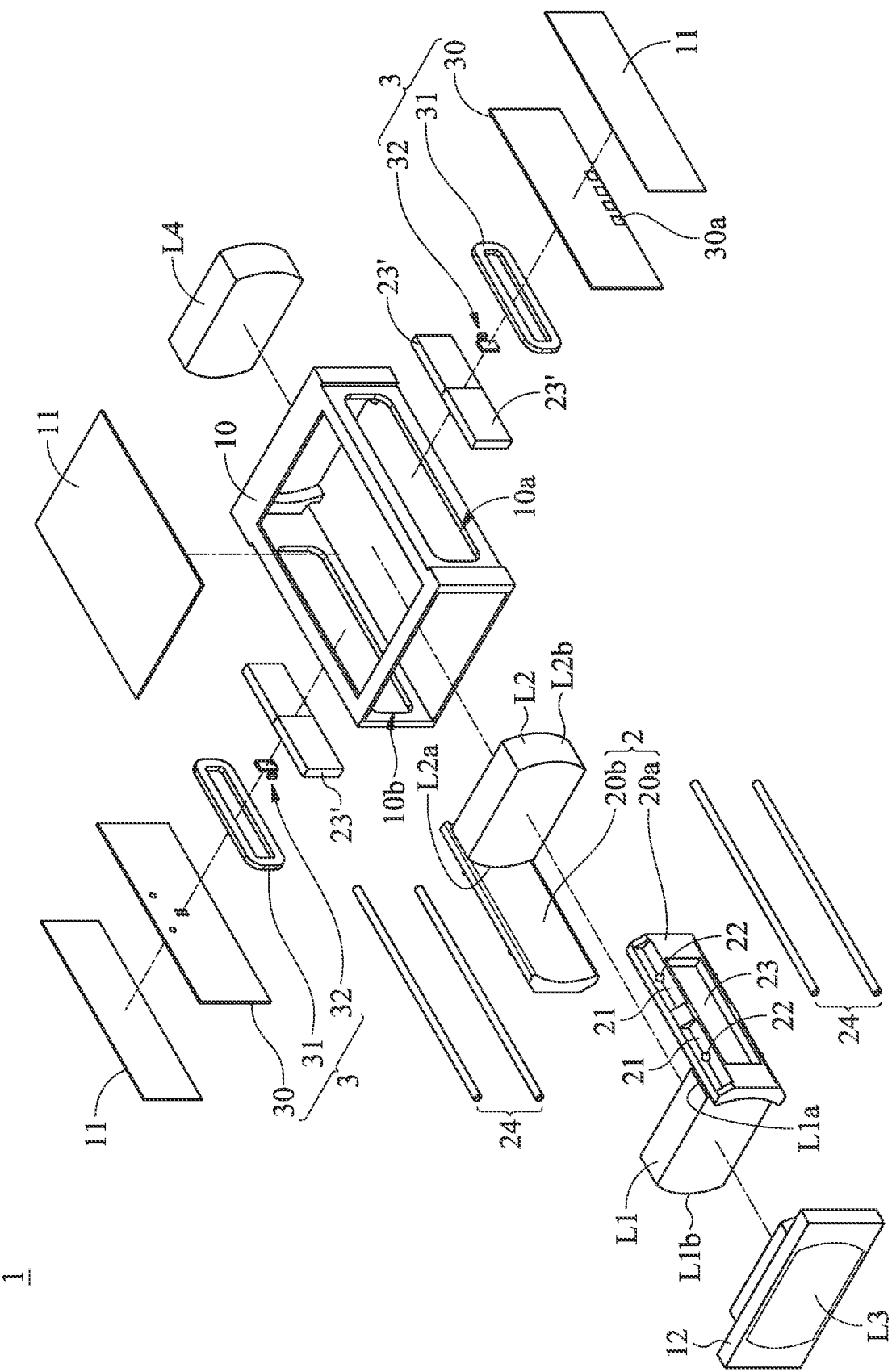
FIG. 3 is an exploded view of the lens device in FIG. 2.
Figure 4:
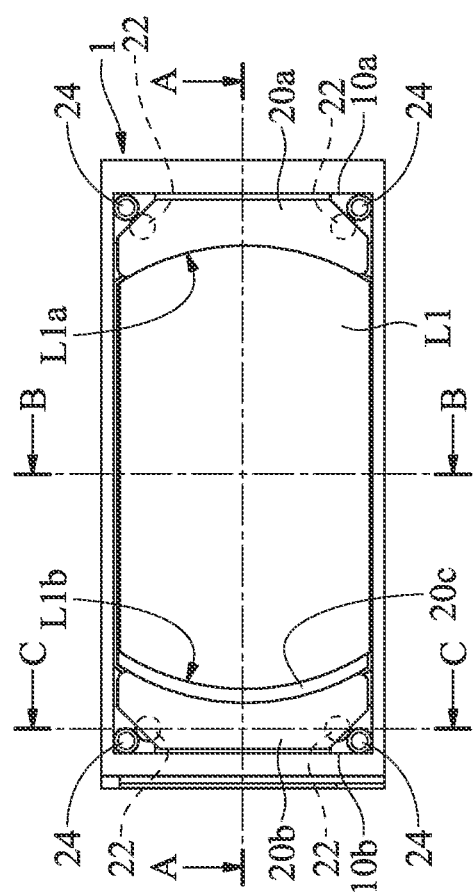
FIG. 4 is a front view of the lens device in FIG. 2, wherein the front cover has been removed.

Please refer to FIGS. 2, 3 and 4, wherein FIG. 2 is a three-dimensional view of the appearance of a lens device 1 according to a first embodiment of the present invention, FIG. 3 is an exploded view of the lens device 1 in FIG. 2, and FIG. 4 is a front view of the lens device 1 in FIG. 2, wherein the front cover 12 has been removed. As shown in FIGS. 2, 3 and 4, the lens device 1 of the present invention is disclosed. The lens device 1 includes a housing 10. The upper side and the lateral side of the housing 10 have covers 11 to protect the inside. Generally, after the assembly is completed, the covers 11 are disposed as the final packaging. The contacts 30a of the circuit board 30 are exposed under the cover 11 at the lateral side to be electrically connected to the external circuit. The guiding rods 24 are disposed in the corners of the housing 10 in the direction parallel to the direction of optical axis of each lens set (the first lens set L1 to the fourth lens set L4), wherein two guiding rods 24 are disposed at the first side 10a in the housing 10, and the other two guiding rods 24 are disposed at the second side 10b in the housing 10. Next, the second stage 20b is disposed on the guiding rod 24 at the second side 10b, and the first stage 20a is disposed on the guiding rod 24 at the first side 10a. As shown in FIG. 3, the second stage 20b is placed in the housing 10 first, and then the first stage 20a is placed therein. Each stage 20a, 20b has a rolling groove 21 thereon for accommodating the balls 22 to roll therein, and restricting the rolling range of the balls 22. In addition, each stage 20a, 20b also has a magnetic inducing portion 23 for accommodating the magnetic inducing element 23' (please refer to the position of the magnetic inducing element 23' in FIG. 7). When each stage 20a, 20b is placed in the housing 10, each ball 22 can roll on the guiding rod 24 (please refer to FIG. 7) to achieve the effect of causing each stage 20a, 20b to slide smoothly. Moreover, two electromagnetic modules 3 are respectively disposed outside the first side 10a and the second side 10b of the housing 10. The electromagnetic module 3 includes a circuit board 30. The circuit board 30 has an inner surface and an outer surface. A coil 31 and a chip 32 are disposed on the inner surface, and the contacts 30a are disposed on the outer surface to be electrically connected to an external circuit (not shown). Generally, when one of the first lens set L1 and the second lens set L2 is fixed, and the other moves, the effect of focusing can be achieved. If the movement is generated between the first lens set L1 and the second lens set L2, such as separate movements, the effects of changing the viewing angle, i.e. the zooming, can be achieved. Further, for a wider zooming range, in the lens device 1 of the present invention, a third lens group L3 and a fourth lens group L4 are respectively disposed at the front and the rear ends of the housing 10. The third lens set L3 usually serves as a part of a front cover 12. After the aforementioned related elements are disposed in the housing 10, the housing 10 can be covered with the front cover 12. For the convenience of manufacturing and assembly, the front cover 12 can be integrally formed with the third lens set L3; further, that is, the front cover 12 is made of optical materials.

Figure 1:
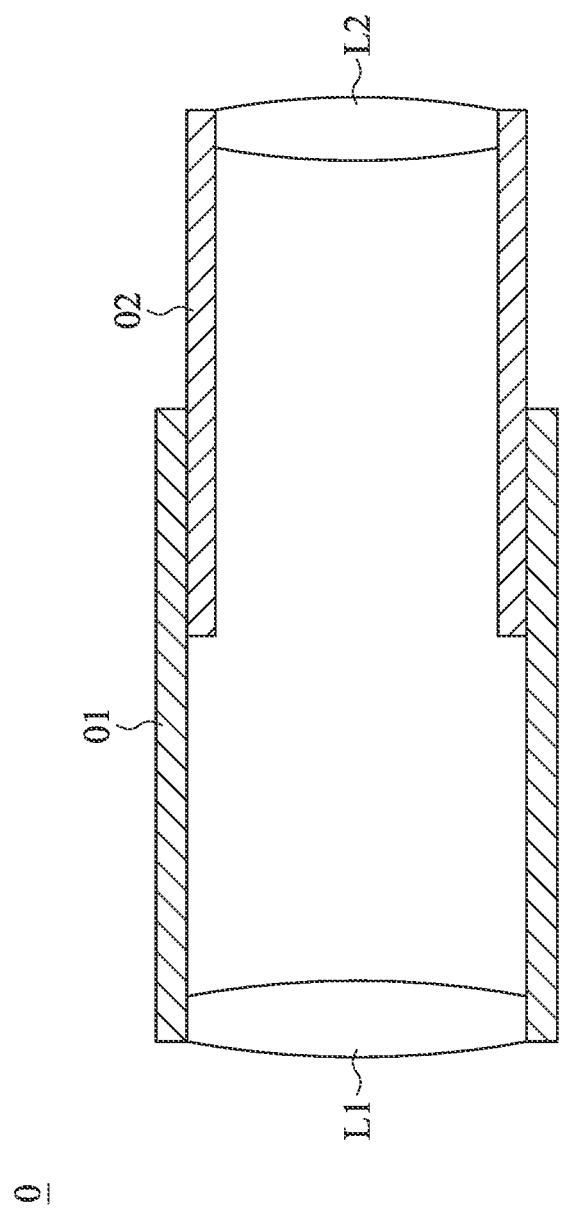
FIG. 1 is a side cross-sectional view of a zooming lens in the prior art.
Figure 5:
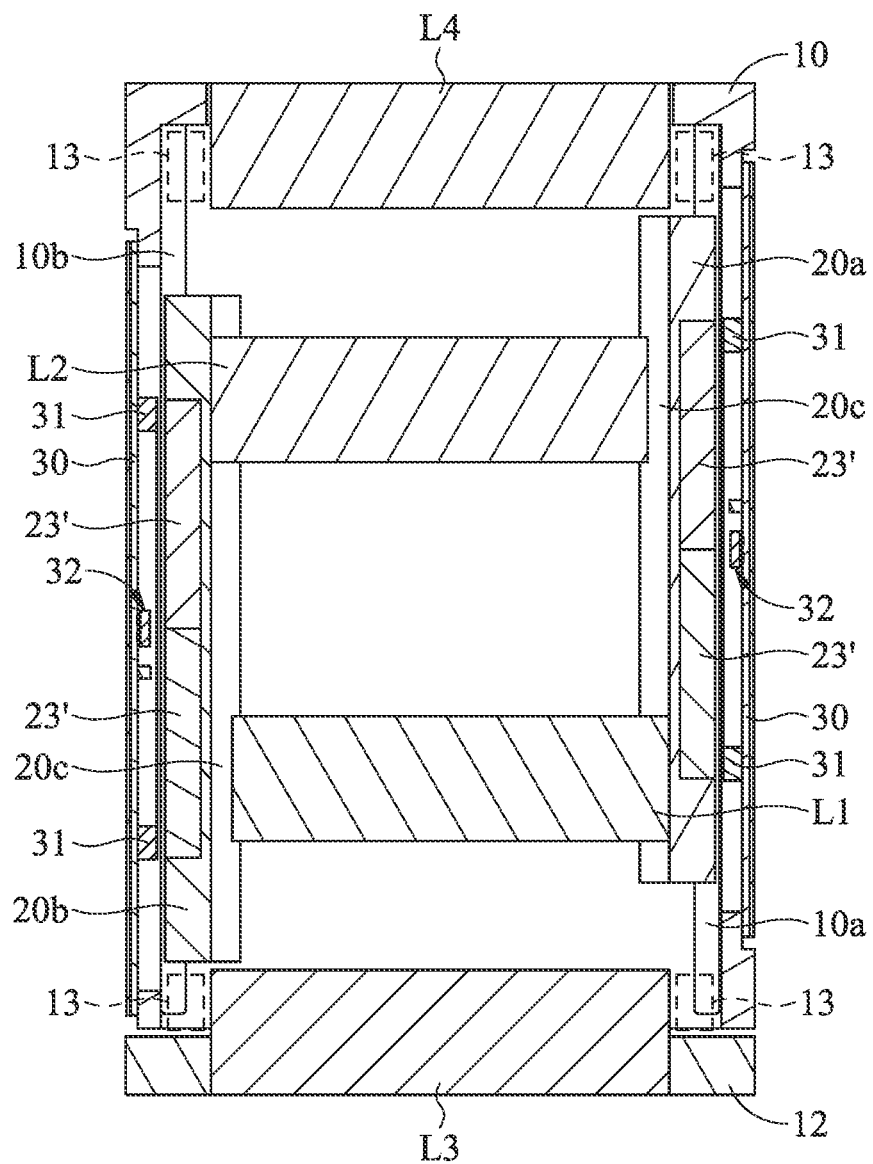
FIG. 5 is a cross-sectional view of the lens device in FIG. 2 along the AA direction in FIG. 4.

Please refer to FIGS. 4 and 5. FIG. 5 is a cross-sectional view of the lens device 1 in FIG. 2 along the AA direction in FIG. 4. As shown in FIG. 4, four guiding rods 24 are respectively disposed at four corners of the housing 10, and each ball 22 rolls on the guiding rod 24. The first stage 20a is slidable on the first side 10a, and the second stage 20b is slidable on the second side 10b. Because the present invention is a miniature photographing device, especially used on the handheld electronic device such as the mobile phone, the size of the lens set L1, L2 is usually very small. Therefore, in order to maintain the stability of the lens set L1, L2 when moving, the stage 20a, 20b for the lens set L1, L2 is often much larger than the lens set L1, L2. It can be seen from FIG. 3 that the lengths of the first and the second stages (20a, 20b) are much larger than the thicknesses of the first and the second lens sets (L1, L2), which may be more than double. In order to prevent the stages 20a, 20b from becoming an obstacle when their respective lens sets approach each other (please refer to the second lens barrel 02 in FIG. 1), the first end L1a of the first lens set L1 is fixed on the first stage 20a, and there is a considerable distance between the second end L1b of the first lens set L1 and the second side 10b for the second stage 20b to pass therethrough. That is, a moving space is formed between the first lens set L1 and the second side 10b for the second stage 20b to pass therethrough. That is, the first lens set L1 is free from interfering with (entering) the moving space of the second stage 20b, and the second lens set L2 is also free from interfering with (entering) the moving space of the first stage 20a. Therefore, a gap 20c is formed between the first lens set L1 and the second stage 20b, and also formed between the second lens set L2 and the first stage 20a. The gap 20c can prevent one lens set L1, L2 from being rubbing, or even colliding, with another stage 20a, 20b. In other words, it can be seen from the cross-sectional view of FIG. 5 that the distance between the second end L1b of the first lens set L1 and the second side 10b is larger than the thickness of the second stage 20b. Similarly, the distance between the second end L2b of the second lens set L2 and the first side 10a is larger than the thickness of the first stage 20a. That is, each stage 20a, 20b has a specific geometric shape. The specific geometric shape in this embodiment means that the thickness of the first stage 20a is smaller than the distance between the second end L2b of the second lens set L2 and the first side 10a; similarly, the thickness of the second stage 20b is smaller than the distance between the second end L1b of the first lens set L1 and the second side 10b. That is, in terms of the horizontal distance, the distance between the second end L1b, L2b of each lens set L1, L2 and its pointing side is larger than the thickness of the stage on the pointing side (please refer to FIG. 4). In this way, the sufficient space can be left for each stage 20a, 20b so that when it moves and passes the peripheral of each lens set L1, L2, the interference or collision does not occur. In other words, two sides 10a, 10b in the housing 10, i.e. the first side 10a and the second side 10b, respectively have a first moving space and a second moving space for their respective stages 20a, 20b to move therein. Each stage 20a, 20b has a lens set L1, L2. The first end L1a, L2a of the lens set L1, L2 is fixed on the stage 20a, 20b, the second end L1b of the first lens set L1 is free from interfering with the moving space of the second stage 20b, and the second end L2b of the second lens set L2 is free from interfering with the moving space of the first stage 20a so that the interference such as the friction or the impact does not occur. It can be seen that the first stage 20a can pass the peripheral of the second lens set L2 without collision or interference, and the second stage 20b can pass the peripheral of the first lens set L1 without collision or interference so that the distance between the first lens set L1 and the second lens set L2 can be zero. In addition, in order to allow the first lens set L1 to be closer to the third lens set L3, and the second lens set L2 to be closer to the fourth lens set L4, ducking spaces 13 are formed at the peripherals of the third lens set L3 and the fourth lens set L4. Each stage 20a, 20b can enter the ducking spaces 13 so that the first lens set L1 and the second lens set L2 can be closer to the third lens set L3 and the fourth lens set L4 respectively.

Figure 6:
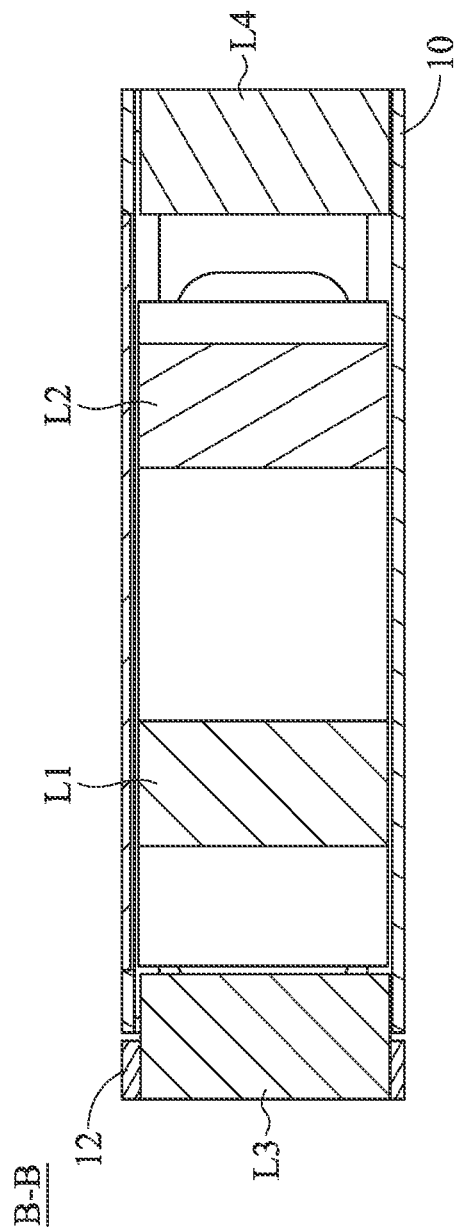
FIG. 6 is a cross-sectional view of the lens device in FIG. 2 along the BB direction in FIG. 4.

Please refer to FIG. 6, which is a cross-sectional view of the lens device 1 in FIG. 2 along the BB direction in FIG. 4. As shown in FIG. 6, the third lens set L3, the first lens set L1, the second lens set L2, and the fourth lens set L4 are disposed from left to right. The peripheral of the third lens set L3 serves as a structure for being fixed to the housing 10.

Figure 7:
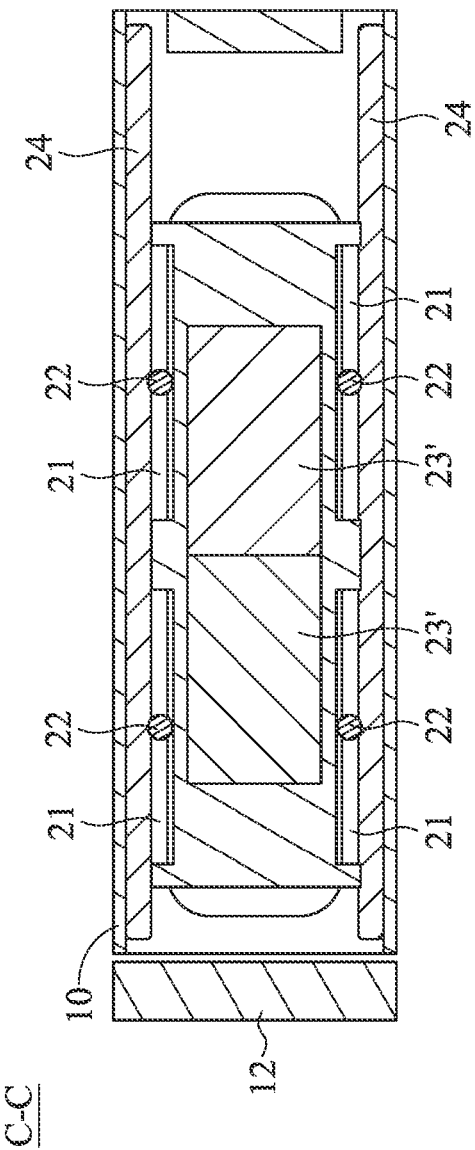
FIG. 7 is a cross-sectional view of the lens device in FIG. 2 along the CC direction in FIG. 4.

Please refer to FIG. 7, which is a cross-sectional view of the lens device 1 in FIG. 2 along the CC direction in FIG. 4. The cross-sectional view of FIG. 7 takes the second stage 20b as an example, wherein the second stage 20b has rolling grooves 21 at its upper side and lower side for the balls 22 to roll on the guiding rods 24 (please refer to FIGS. 3 and 4). A magnetic line of force is formed between the magnetic inducing element 23' and the coil 31 (please refer to FIGS. 3 and 5). At this time, the magnetic inducing element 23' can be attracted toward the coil 31 so that the balls 22 can be closely attached to the guiding rods 24 to cause the guiding rods 24 to be like tracks. Moreover, both the balls 22 and the guiding rods 24 can be made of magnetically conductive materials.

Figure 8:
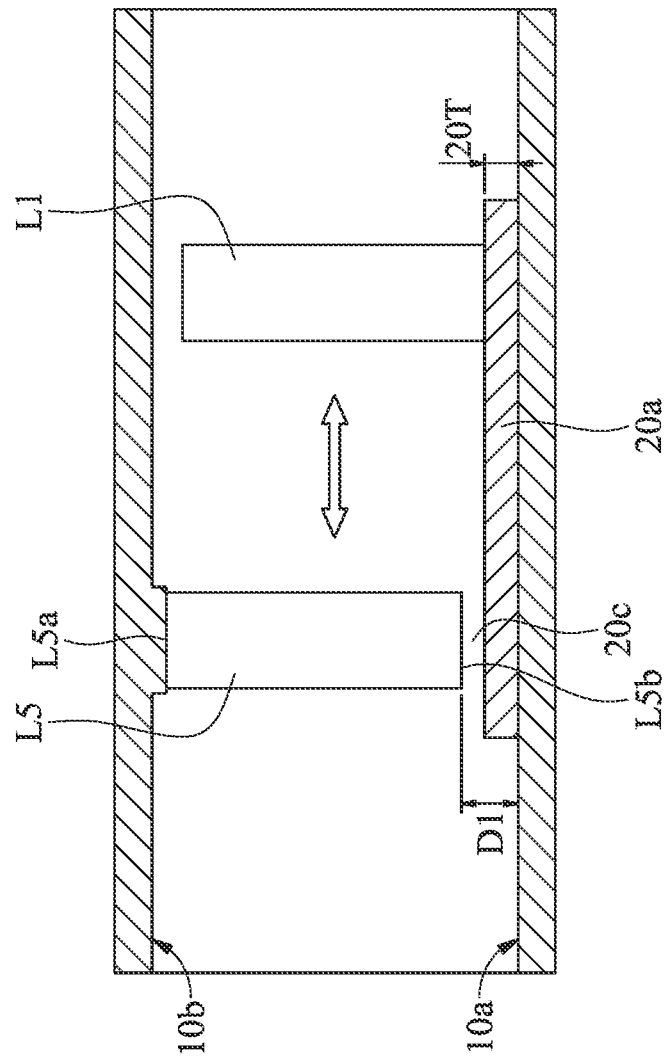
FIG. 8 is a cross-sectional view of a lens device according to a second embodiment of the present invention, showing how to focus.

Please refer to FIG. 8, which is a cross-sectional view of a lens device 1' according to a second embodiment of the present invention, showing how to focus. FIG. 8 discloses that the lens device 1' has a fifth lens set L5 fixed on the second side 10b in the housing 10, and the first lens set L1 is borne by the movable stage 20a so that it can move forward and backward to achieve the effect of focusing. The first end L5a of the fifth lens set L5 is used to be fixed on the second side 10b, and the thickness D1 of the space between the second end L5b and the first side 10a is larger than the thickness 20T of the first stage 20a so that a gap 20c is formed. In other words, a moving space is formed between the second end L5b and the first side 10a for the movable stage 20a to pass therethrough.

Figure 9:
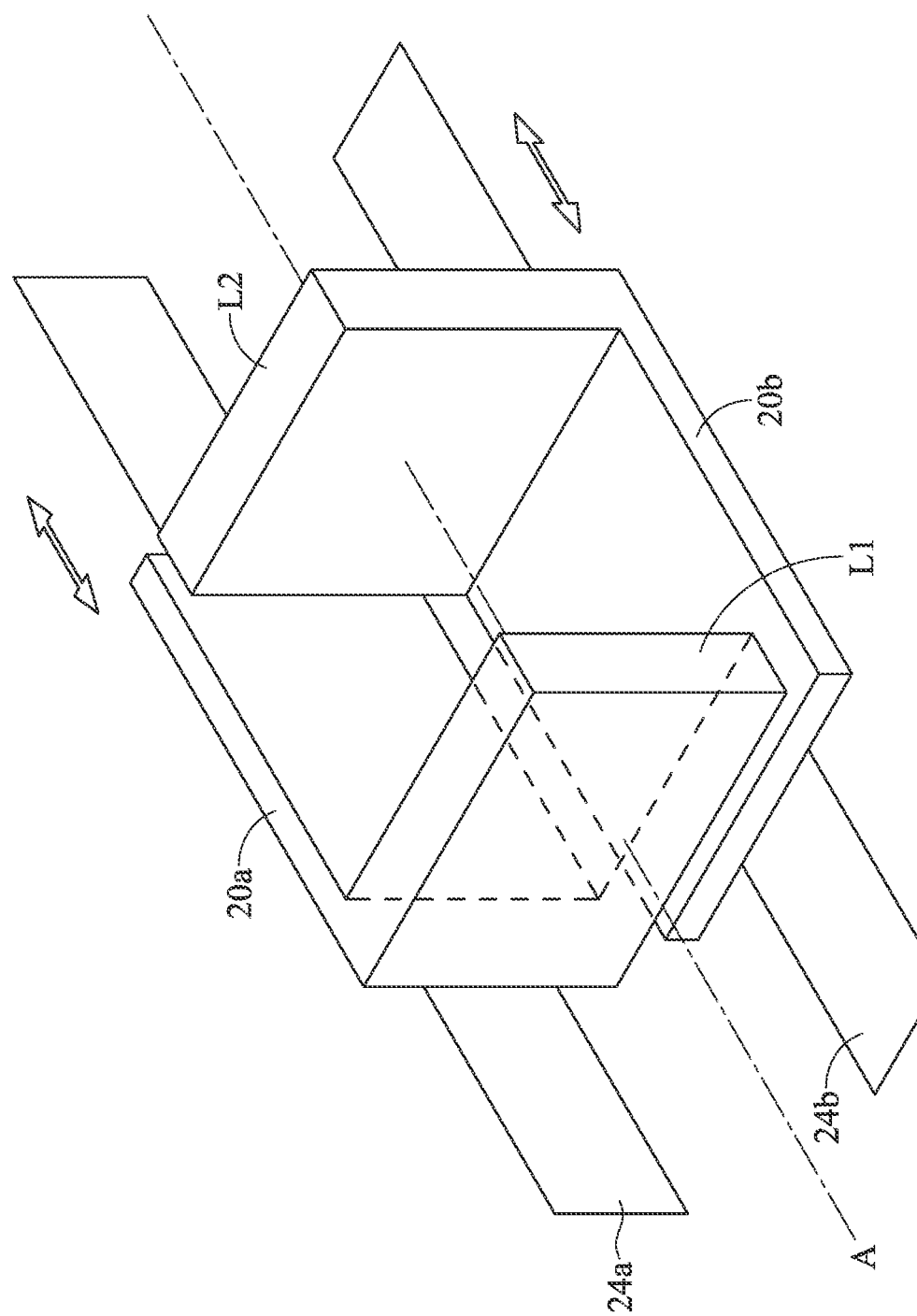
FIG. 9 is a three-dimensional view of a lens device according to a third embodiment of the present invention.

Please refer to FIG. 9, which is a three-dimensional view of a lens device according to a third embodiment of the present invention. The included angle between the first stage 20a and the second stage 20b in FIG. 9 relative to the optical axis A is about 90 degrees. However, the included angle between the first stage 20a and the second stage 20b in the previous embodiments is 180 degrees; the reason why it is 180 degrees is that the present invention mostly uses the voice coil motor to drive each stage 20a, 20b so that there will be the problem of the magnetic field interference if the first stage 20a and the second stage 20b are too close. Nevertheless, if other driving methods which do not generate the magnetic field interference are used, the choice of the relative positions between the stages 20a, 20b is wider. As shown in FIG. 9, the two stages 20a, 20b are disposed adjacent to each other. The first stage 20a is slidable on the first track 24a, the second stage 20a is slidable on the second track 20b, and there is a moving space between the first stage 20a and the second track 24b for the second stage 20b to move therein. Similarly, there is a moving space between the second stage 20b and the first track 24a for the first stage 20a to move therein. That is, the first stage 20a passes the peripheral of the second lens set L2, and the second stage 20b passes the peripheral of the first lens set L1. Compared with FIG. 4, it is known that because two sides of the lens device 1 in FIG. 4 respectively include a lateral electromagnetic circuit 3 and a stage 20a, 20b, the shape of the lens device 1 in FIG. 4 tends to be flat with respect to the ratio of the vertical and horizontal directions. In contrast, the first stage 20a and the first track 24a of the lens device in FIG. 9 are at the left side, and the second stage 20b and the second track 24b in FIG. 9 are at the lower side so that the shape of the lens device in FIG. 9 tends to be square with respect to the ratio of the vertical and horizontal directions. Therefore, different arrangements for the stage position can cooperate with different handheld electronic devices.

Figure 10:
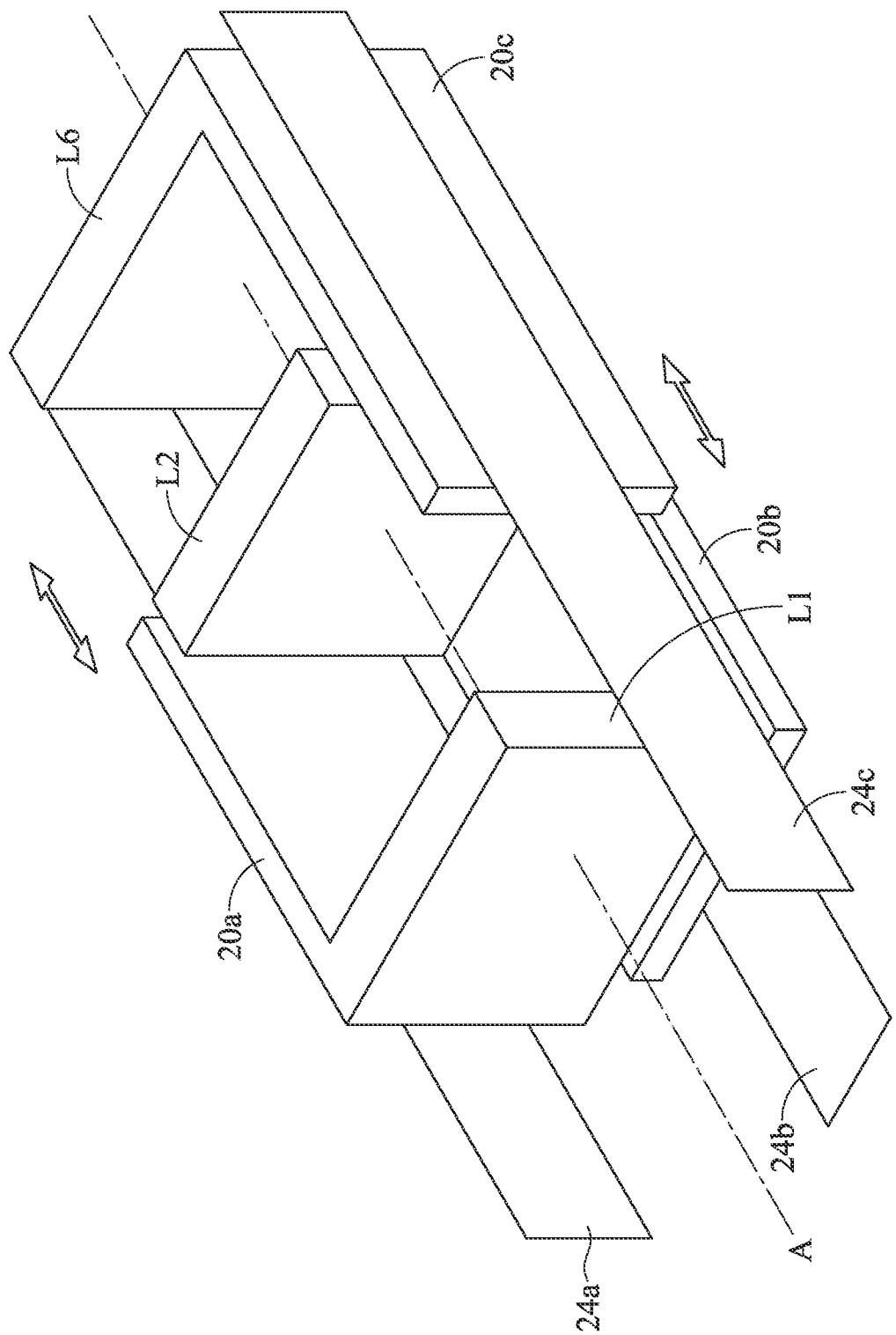
FIG. 10 is a three-dimensional view of a lens device according to a fourth embodiment of the present invention, wherein the lens device has three stages.

Please refer to FIG. 10, which is a three-dimensional view of a lens device according to a fourth embodiment of the present invention, wherein the lens device has three stages 20a, 20b, 20c. The included angle between the first stage 20a and the second stage 20b in FIG. 10 relative to the optical axis A is about 90 degrees, and the included angle between the third stage 20c and the second stage 20b in FIG. 10 relative to the optical axis A is about 90 degrees; however, the included angle between the third stage 20c and the first stage 20a is about 180 degrees. A sixth lens set L6 is disposed on the third stage 20c. When other driving methods which do not generate the magnetic field interference are used, the choice of the relative positions between the stages 20a, 20b is wider so that more stages can be disposed. As shown in FIG. 10, the first stage 20a and the second stage 20b are disposed adjacent to each other, and the second stage 20b and the third stage 20c are also disposed adjacent to each other. The third stage 20c is slidable on the third track 24c, and the second stage 20b is slidable on the second track 24b. Therefore, according to FIG. 9 and its related descriptions, there is a moving space between the third stage 20c and the second track 24b for the third stage 20c to move therein. Similarly, there is a moving space between the second stage 20b and the third track 24c for the second stage 20b to move therein. That is, the first stage 20a passes the peripherals of the second lens set L2 and the sixth lens set L6, the second stage 20b passes the peripheral of the first lens set L1, and the third stage 20c passes the peripherals of the first lens set L1 and the second lens set L2. Compared with FIG. 4, the first stage 20a and the first track 24a in FIG. 10 are at the left side, the second stage 20b and the second track 24b in FIG. 10 are at the lower side, and the third stage 20c and the third track 24c in FIG. 10 are at the right side so that the size of the lens device in FIG. 10 is smaller with respect to the ratio of the vertical and horizontal directions. Therefore, different arrangements for the stage position can cooperate with different handheld electronic devices.

In summary, the present invention uses the arrangement of the relative positions between the moving spaces and the lens sets so that when two stages move their respective lens sets, one of the lens sets does not collide or rub the stage on which the other one of the lens sets is disposed. The reason for designing the present invention is that in the field of the micro-photographic lens, because the size of the lens set is very small, if the stable movement of the lens set is to be maintained, the length of the structure (stage, lens barrel) for bearing the lens set will be two or even three times the thickness of the lens set. If the lens barrel structure is used, due to the limitation on the length of the inner lens barrel, the moving distance of the lens set required for the zooming and focusing is very limited. If the moving distance of the lens set during the zooming and focusing is to be increased, a multi-layered lens barrel structure needs to be used. In this way, the diameter of the lens device is increased so that the volume of the lens device is bigger. Therefore, in the field of the micro-photographic lenses, the effect of reducing the volume of the lens can be achieved through the moving space of the present invention. In detail, the range of the focusing and zooming of the lens can be larger under the same volume, or the volume of the lens is reduced under the same range of the focusing and zooming of the lens. It can be seen that the present invention has a great contribution to the related industries.

EMBODIMENTS

1. A lens device, comprising a housing having a first end and a second end opposite to the first end; a first track disposed from the first end to the second end in the housing; a second track disposed from the first end to the second end in the housing, and located opposite to the first track; a first stage movably disposed on the first track, and bearing thereon a first lens set; a second stage movably disposed on the second track, and bearing thereon a second lens set; a third lens set and a first ducking space disposed at the first end; and a fourth lens set and a second ducking space disposed at the second end, wherein a first distance between the first lens set and the second track is greater than a first thickness of the second stage, and a second distance between the second lens set and the first track is greater than a second thickness of the first stage.

2. The lens device of Embodiment 1, wherein the first stage is parallel to the second stage.

3. The lens device of any one of Embodiments 1-2, wherein the first stage and the second stage are slidably disposed in the housing.

4. The lens device of any one of Embodiments 1-3, wherein the housing further has a first side for the first stage to slide therealong, and a second side for the second stage to slide therealong.

5. The lens device of any one of Embodiments 1-4, wherein a first moving space is formed between the first side and the second lens set for the first stage to pass therethrough, and a second moving space is formed between the second side and the first lens set for the second stage to pass therethrough.

6. The lens device of any one of Embodiments 1-5, wherein a first coil set is further disposed on the first side, and a second coil set is further disposed on the second side.

7. The lens device of any one of Embodiments 1-6, wherein the first and the second stages each is equipped with a magnetic inducing element.

8. A lens set moving mechanism, comprising a first stage having a first end and a second end opposite to the first end, and bearing a first lens set on the first end; and a second stage having a third end and a fourth end opposite to the third end, and bearing a second lens set on the fourth end, wherein when the first stage and the second stage approach each other, the second stage passes a first peripheral of the first lens set, or the first stage passes a second peripheral of the second lens set.

9. The lens set moving mechanism of Embodiment 8, wherein the first stage is parallel to the second stage.

10. The lens set moving mechanism of any one of Embodiments 8-9, wherein the first stage and the second stage are slidably disposed in the housing, 11. The lens set moving mechanism of any one of Embodiments 8-10, wherein the housing further has a first side for the first stage to slide therealong, and a second side for the second stage to slide therealong.

12. The lens set moving mechanism of any one of Embodiments 8-11, wherein a first moving space is formed between the first side and the second lens set for the first stage to pass therethrough, and a second moving space is formed between the second side and the first lens set for the second stage to pass therethrough.

13. The lens set moving mechanism of any one of Embodiments 8-12, wherein a first coil set is further disposed on the first side, a second coil set is further disposed on the second side, and the first and the second stages each is equipped with a magnetic inducing element.

14. A lens device, comprising a housing; two stages slidably disposed on the housing; and two lens sets having an optical axis, and respectively disposed on the two stages to complete a zooming function or a focusing function of the lens device, wherein the two stages are disposed in the housing along an axial direction of the optical axis; and each of the two stages has a specific geometric shape configured to allow the distance between the two lens sets to be zero.

15. The lens device of Embodiment 14, wherein the two stages are respectively disposed on two sides of the optical axis.

16. A lens device, comprising a housing; a first lens set having a first end and a second end, wherein the first end is fixed on one of the housing and a first stage, and a moving space is formed between the second end and the housing; a second stage disposed on the housing, and slidable in the moving space; and a second lens set disposed on the second stage, and configured to perform a focusing function of the lens device.

17. The lens device of Embodiment 16, wherein when the first end is fixed on the housing, the first and the second lens sets have an optical axis; the second stage is disposed in the housing along an axial direction of the optical axis; and when the first and the second lens sets approach each other, the second stage passes a peripheral of the first lens set.

18. The lens device of any one of Embodiments 16-17, wherein when the first end is fixed on the first stage, the housing has two moving spaces inside; the first and the second stages are slidable in the two moving spaces respectively; and the first and the second lens sets have an optical axis, and are respectively disposed on the first and the second stages to complete a change of a relative position between the first lens set and the second lens set, wherein the first lens set is free from interfering with the moving space of the second stage, and the second lens set is free from interfering with the moving space of the first stage.

19. The lens device of any one of Embodiments 16-18, wherein the first stage and the second stage are respectively disposed on two sides of the optical axis.

20. The lens device of any one of Embodiments 16-19, further comprising a plurality of stages, each of which disposes thereon at least one lens set, wherein when any two adjacent lens sets approach each other, the respective stage on which one of the two adjacent lens sets is disposed passes a peripheral of the other one of the two adjacent lens sets.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A lens device, comprising:
   a housing having a first end and a second end opposite to the first end;
   a first track disposed from the first end to the second end in the housing;
   a second track disposed from the first end to the second end in the housing, and located opposite to the first track;
   a first stage movably disposed on the first track, and bearing thereon a first lens set;
   a second stage movably disposed on the second track, and bearing thereon a second lens set;
   a third lens set and a first ducking space disposed at the first end; and
   a fourth lens set and a second ducking space disposed at the second end, wherein:
   a first distance between the first lens set and the second track is greater than a first thickness of the second stage, and a second distance between the second lens set and the first track is greater than a second thickness of the first stage;
   the lens device has an optical axis;
   each of the first lens set, the second lens set, the third lens set, and the fourth lens set has a cross section perpendicular to the optical axis; and
   the cross section of each of the first lens set, the second lens set, the third lens set, and the fourth lens set has an upper surface and a lower surface parallel to each other and approximates a rectangular shape having the upper surface and the lower surface parallel; to each other.

2. The lens device as claimed in claim 1, wherein the first stage is parallel to the second stage.

3. The lens device as claimed in claim 1, wherein the first stage and the second stage are slidably disposed in the housing.

4. The lens device as claimed in claim 3, wherein the housing further has a first side for the first stage to slide therealong, and a second side for the second stage to slide therealong.

5. The lens device as claimed in claim 4, wherein a first moving space is formed between the first side and the second lens set for the first stage to pass therethrough, and a second moving space is formed between the second side and the first lens set for the second stage to pass therethrough.

6. The lens device as claimed in claim 5, wherein a first coil set is further disposed on the first side, and a second coil set is further disposed on the second side.

7. The lens device as claimed in claim 6, wherein the first and the second stages each is equipped with a magnetic inducing element.

* * * * *